Sept. 19, 1933.   W. ROGOWSKI ET AL   1,927,755
METHOD OF TRANSMITTING ELECTRIC POTENTIALS
Filed April 9, 1931

Inventor:
Walter Rogowski and Walter Grösser
and Johann Peek
per
Attorney.

Patented Sept. 19, 1933

1,927,755

UNITED STATES PATENT OFFICE 1,927,755

METHOD OF TRANSMITTING ELECTRIC POTENTIALS

Walter Rogowski, Walter Grösser, and Johann Peek, Aachen, Germany

Application April 9, 1931, Serial No. 528,934, and in Germany March 8, 1930

2 Claims. (Cl. 178—44)

For many purposes, such as in amplifiers, it is necessary to transmit the potential difference arising between a pair of points of a circuit to another pair of points.

The invention has for its object to provide a simple and most efficient method for effecting such transmissions, the main feature residing in the use of glow discharge lamps which permit of transmitting not only quick but also slow potential variations.

In order to allow of the invention to be clearly understood we shall now proceed to describe it with reference to the accompanying drawing.

Figure 1:
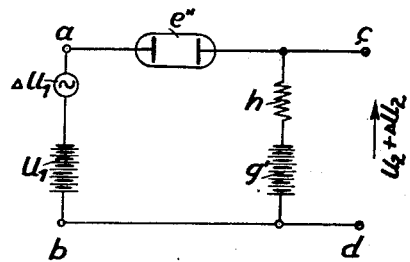
Figure 2:
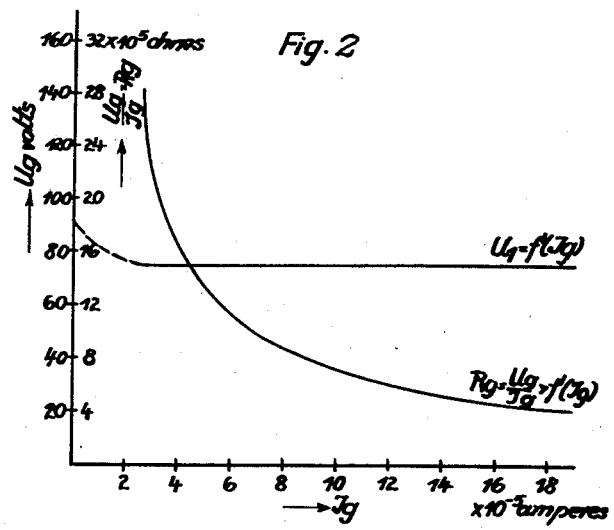
Figure 3:
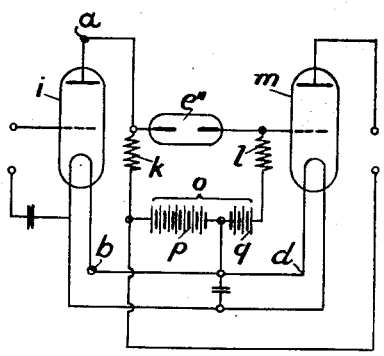

Fig. 1 is a diagram of a system according to the invention, Fig. 2 illustrates a characteristic of the relation between current and voltage of a glow discharge lamp, Fig. 3 is a diagram of an amplifier embodying the invention.

The problem in question is to transmit the potential difference arising between any selected points $a$ and $b$ of a circuit to another pair of points $c$ and $d$. The potential between the points $a$ and $b$ often consists of a direct current voltage $U_1$ superposed by a voltage $\Delta U_1$, for instance a pure alternating current voltage, which is dependent on the time. In these cases, the transmission of the total potential $U_1+\Delta U_1$ to the terminals $c$ and $d$ should generally be so that it produces between these terminals a direct current voltage $U_2$ different from $U_1$ and an alternating current voltage $\Delta U_2$ superposed on the voltage $U_2$ and dependent on the time and proportional to the voltage $\Delta U_1$.

Potential transmissions have to be effected, for instance, in amplifiers between the anode of one of the potential amplifying tubes to the grid of the next tube. The requirement in these cases is a transmission, true within vast limits, of the variations of the anode potential to the grid and a simultaneous transition from the amount of the positive direct current voltage of the anode to the generally negative biasing voltage of the grid.

Most of the methods of potential transmission known hitherto have the fundamental drawback that very slow potential variations are not transmitted at all or only very badly. The transmission by means of a transformer and the known resistance condenser coupling in a normal resistance amplifier belong to these known methods of transmission.

The known methods designed to transmit also slow potential variations have other drawbacks, which are in part of electrical nature, such as suppression of high frequencies, and in part of economical nature, such as an increased expenditure of direct current sources.

In contradistinction to the known arrangements, there are used according to the invention one or more glow discharge lamps by means of which it is possible to transmit not only quick but also slow potential variations.

A simple embodiment of a system according to the invention is shown in Fig. 1. Connected between $a$ and $c$ is a discharge lamp $e''$, between $c$ and $d$ a direct current source $g'$ and a high resistance $h$, preferably an ohm resistance. The conditions are so chosen that the discharge lamp burns constantly.

A glow discharge lamp essentially differs in its behaviour from an ohm resistance in that the course of the relation between current and voltage is not linear but in accordance with a characteristic such as illustrated in Fig. 2. It is a particular property of the discharge lamp that the potential remains practically unchanged within a certain current range. If there is in this range a direct current and an alternating current superposed on the former, the voltage at the lamp remains substantially constant, that is to say the alternating current resistance of the lamp is practically zero or at least very small. The direct current resistance $R_g$ of the lamp is determined by the proportion of the direct current voltage to the respective direct current, it being very high. Normal values for the alternating current resistance and the direct current resistance are, for example, 10000 ohms and 2, 3 megohms.

The resistance $h$ of Fig. 1 is preferably chosen so that it is small with reference to the direct current resistance and large with reference to alternating current resistance of the discharge lamp. Thereby, it is attained that, on the one hand, almost the full value of the potential variations $\Delta U_1$ is transmitted to the points $c$ and $d$, and on the other hand an auxiliary battery $g'$ of small voltage suffices to obtain the desired direct current voltage $U_2$ between $c$ and $d$.

If the direct current resistance of the discharge lamp is 2, 3 megohms, its alternating current resistance 10000 ohms, and if the resistance $h$ is 500000 ohms. $U_1$ is 70 volts and the discharge lamp current is $3 \cdot 10^{-5}$ amperes, then an auxiliary voltage of about only $-15$ volts is sufficient for obtaining between the points $c$ and $d$ a direct current voltage $U_2$ of zero volt. On the other hand, there is still transmitted in this case to the points $c$ and $d$ 98 per cent of a potential variation $\Delta U_1$, the maximum value of which may under these conditions be about 5 volts with a discharge lamp of the characteristic illustrated in Fig. 2. As the discharge lamp is practically entirely independent as to frequencies, the system according to Fig. 1 works practically independent as regards the quickness of the potential variations $\Delta U_1$.

Instead of only one discharge lamp, there may also be used a plurality of lamps, connected in series or in parallel or in suitable combinations. If instead of the resistance $h$ there is used an element which offers no essential resistance to direct current, it may become necessary to add still one or more resistances (ohm resistances) for stabilizing the discharge lamp current. Instead of the direct current sources there may also be used direct current potential drops at ohm resistances.

Fig. 3 shows the present invention as applied to an amplifier working with thermionic valves. The periodic or aperiodic potential to be amplified is supplied, between the points $a$ and $b$, to the control grid of a thermionic valve $i$. The potential variations occurring at the resistance $k$ inserted in the anode circuit are transmitted through a glow discharge lamp $e''$ to a resistance $l$. The potential variations arising at $l$ control another thermionic valve $m$. $o$ is a source of voltage which is divided into two parts $p$ and $q$. The part $p$ constitutes the direct current voltage of the anode of tube $i$. The source $o$ is of such a kind that the direct current voltage at the glow discharge lamp $e''$ is always so strong that the lamp is kept burning. The part $q$ of the source $o$ serves to put into the control grid of the tube $m$ the required negative prepotential.

The showing in Fig. 1 is based on the assumtion that the potential between $a$ and $b$ is composed of a battery voltage $U_1$ and a pure alternating current voltage $\Delta U_1$. However, the potential $U_1 + \Delta U_1$ between $a$ and $b$ may, indeed, be produced anyhow and $\Delta U_1$ may anyhow be dependent on the time.

Having thus described our invention, what we claim as new and desire to secure by Letters Patent is:—

1. In an electric system for transmitting potential variations, in combination a pair of electric conductors having applied to them a varying potential, another pair of conductors to which the variations are to be transmitted, an electric resistance and a source of direct current voltage in series between the two last said conductors, an electric connection between one conductor of the first and one conductor of the second pair of conductors, an electric connection between the remaining two of the four conductors, at least one gas discharge tube in one of the said connections, the gas discharge tube having a high direct current resistance and a low positive alternating current resistance, and means for keeping the gas discharge tube constantly burning during the operation of the system.

2. In an electric amplifying system, in combination at least two amplifying tubes, a source of direct current voltage and an electric resistance in series between the anode and the cathode of the first amplifying tube, a source of direct current voltage and an electric resistance between the grid and the cathode of the second amplifying tube, an electric connection between the cathodes of the two amplifying tubes, an electric connection between the anode of the first and the grid of the second amplifying tube, and at least one gas discharge tube in the last said connection, this discharge tube having an operating voltage allowing it to constantly burn during the working of the system and adapted to transmit the potential variations of the anode of the first amplifying tube to the grid of the other amplifying tube.

WALTER ROGOWSKI.
WALTER GRÖSSER.
JOHANN PEEK.